United States Patent

Solanki et al.

[11] Patent Number: 5,352,526
[45] Date of Patent: Oct. 4, 1994

[54] HARDFACED ARTICLE AND PROCESS TO PREVENT CRACK PROPAGATION IN HARDFACED SUBSTRATES

[75] Inventors: Mukesh M. Solanki; Christopher B. Harley, both of New Albany, Ind.

[73] Assignee: Pullman Company, Highland Heights, Ohio

[21] Appl. No.: 475,757

[22] Filed: Feb. 6, 1990

[51] Int. Cl.⁵ .............................................. B32B 15/08
[52] U.S. Cl. ................................... 428/422; 156/62.8; 428/463
[58] Field of Search ............... 428/422, 463, 698, 699; 156/62.8; 419/10

[56] References Cited

U.S. PATENT DOCUMENTS

| | | | |
|---|---|---|---|
| 3,743,556 | 7/1973 | Breton et al. | 156/62.8 |
| 3,864,124 | 2/1975 | Breton et al. | 419/10 |
| 4,194,040 | 3/1980 | Breton et al. | 428/422 X |

*Primary Examiner*—Thomas J. Herbert, Jr.
*Attorney, Agent, or Firm*—Susan A. Capello; John D. Kaufmann

[57] ABSTRACT

A composite article and process forming a soft metallic layer, underneath a hardface coating, on a metallic substrate, using cloth-like flexible preforms. The softer layer formed underneath the hardfacing should be one having a hardness below 35 HRC, preferably 30 HRC, and should not experience any significant physical changes, e.g., increase in hardness, upon heat treatment.

6 Claims, 3 Drawing Sheets

HARDFACED ARTICLE AND PROCESS TO PREVENT CRACK PROPAGATION IN HARDFACED SUBSTRATES

The present invention relates to the modification of selected physical properties of preformed metal articles, and more particularly to preventing crack propagation in hardfaced metal substrates.

BACKGROUND OF THE INVENTION

It is sometimes advantageous to coat a substrate, especially a metal, with a coating having special properties, for example, wear resistance or corrosion resistance. Wear resistance can be provided for a substrate by coating it with a coating composed of a mixture of hard abrasive material such as powdered tungsten carbide or the like, dispersed in a hard filler metal. Corrosion resistance can be provided to a substrate with a similar coating composed of a corrosion resistant metal or alloy. Other special or improved physical properties can be obtained in a similar manner substituting other matrix materials.

Prior to the work of Breton et al. (U. S. Pat. Nos. 3,743,556, 3,916,506, and 4,194,040 the specifications and claims of which are incorporated herein by reference) it was difficult to produce such a coating, especially on objects having an intricate or complicated shape or requiring a coating thickness of greater than 0.020 of an inch. In the prior methods using plasma and flame spraying techniques, it was difficult to get uniform coatings on a substrate, especially a substrate having an intricate surface. A similar difficulty occurred in the prior method using techniques such as abrasive particle dusting onto the substrate.

Breton et al eliminated many of the difficulties that existed in the prior art methods by providing a method using a first layer of a desired thickness of a high melting point powdered matrix material in an organic binder material and a second layer of a lower melting temperature powdered brazing filler material also in an organic binder. The first layer is then placed on the substrate with the second layer in turn placed on top of it. The matrix material is characterized as being wetted by the brazing filler metal or alloy in the molten state. This assembly is then heated to decompose the binder and melt the filler metal or alloy which is infused by capillary action into the matrix layer. Cooling then yields an essentially void-free coating bonded on the substrate. The method for preparing both the hard particle matrix material as well as the braze filler alloy layers or performs, using fibrillated polytretra fluoroethylene (PTFE) is disclosed in U. S. Pat. Nos.3,916,506 and 4,194,040.

The coating typically consists of hard particles such as tungsten carbide, chromium carbide, titanium carbide, nickel boride or diamond etc. and provides a very hard and brittle surface, which is susceptible to cracking under thermal or mechanical stresses. As the flexible preform coatings are generally brazed in a controlled atmosphere or vacuum furnace at a temperature above the liquids temperature of the braze filler alloy and the cooling rate is generally slow it causes grain growth in the metallic substrate, which results in loss in hardness as well as the strength. In many instances, the coated parts are later heat treated to achieve required hardness and the strength in the substrate. Depending upon the substrate alloys and required properties, the heat treating conditions vary, but in most common alloy steels (e.g., AISI 1045, 4130, 4140 , 4340 and some tool steel) it is required that the parts be heated in excess of 1500° F. and hardened by quenching in forced air, molten salt bath, oil or water. Quenching a coated part in any of the stated media may induce extreme thermal stresses in the coating and may result in cracking. These cracks may continue to grow from coating to substrate while being heat treated or later from mechanical stresses imposed during usage. Crack growth in the substrate will lead to premature failure of the coated article or component.

In conventional coating methods, e.g. , weld overlay, spraying, fused or plasma coating processes., etc., a softer metallic coating is sometimes applied on the substrate surface prior to applying the hardface coating. The reason for applying this softer layer between hardface coating and substrate is that it acts as a barrier to crack growth into the substrate thus preventing a catastrophic failure during the usage. In common practice, the soft intermediate layer is applied in a separate step by a weld overlay or a spray process.

The disadvantage with weld overlay method is that the surface of the layer is very rough and non-uniform in thickness, therefore, machining or grinding of the surface is required prior to hardfacing in addition to the fact that it requires a separate manufacturing step. Also, this process is not feasible where the surface to be coated is out of line of sight or has very complex geometry. The spray method may be a better process for such application since it provides a more uniform thickness of soft layer, with a smoother surface, however, it still requires the additional manufacturing step and where the area to be coated is out of the line of sight or on an inner surface, such as a small diameter pipe, this method cannot provide consistent durable results.

SUMMARY OF INVENTION

The present invention provides a composite article and process for producing such article which incorporates a substrate and a hard matrix surface coating with improved cracking resistance made in a single heating operation. The invention provides for a soft metallic layer underneath the surface coating made from a cloth-like flexible layer preform so as to be able to put this soft layer on a complex geometry or on a surface which is out of line of sight and also producible in a single heat brazing operation.

In accordance with one aspect of the present invention, there is provided a tough composite article adapted to be produced in a single braze heating operation having a substrate with a surface with a hard surface coating applied thereto, the surface coating being formed by the residue after braze heating of a cloth-like flexible preform layer made by mixing a powder of the desired surface coating with PTFE and then mechanically fibrillating said mixture and rolling; the improvement comprising a soft metallic sheet of desired configuration positioned between said substrate surface and said surface coating being formed by the residue after the heat brazing of a cloth-like flexible preform sheet made by mixing powder of the soft metallic material with PTFE and the mechanically fibrillating said mixture and rolling, thereby yielding the composite article resistant to crack propagation which is produced in a single braze heating operation.

In accordance with another aspect of the present invention, there is provided a hardfaced article with a hardface coating and a soft metallic layer having a hardness below 35 HRC able to be applied uniformly to a complex geometry or a surface which is out of the line of sight and to be produced in a single braze heating operation.

In accordance with yet another aspect of the present invention, there is provided a method of preventing crack propagation in a hard surfaced composite article adapted to be produced in a single braze heating operation in which the article has a hard metallic surface layer on a substrate, the surface layer being formed by the residue of a flexible cloth-like preform made by mixing a powder metal of the surface layer with PTFE and mechanically fibrillating and rolling the mixture to form said preform of desired configuration; the improvement comprising interposing a soft metallic sheet between the hard surface layer preform and the substrate, the soft metallic sheet being formed of a cloth-like preform made by mixing soft metal powder of the sheet with PTFE and mechanically fibrillating and rolling the mixture to form said preform sheet of desired configuration, and heat brazing the surface layer preform and soft sheet preform to the substrate in a single operation yielding a hard surfaced composite article with toughness against crack propagation.

One benefit obtained by the present invention is to provide a hard surfaced composite article with resistance to crack propagation.

Another benefit obtained by the present invention is to provide a hard surfaced composite article with improved crack propagation properties adapted to be metallurgically bonded together in a single heat brazing operation.

It is an object of this invention to provide an improved hard surfaced composite article.

It is another object of this invention to provide an improved hard surfaced composite article which is easy, reliable and economical to produce.

It is yet another object of this invention to provide the method of producing an improved hard surfaced composite article.

Further features and advantages of the invention will readily be apparent from the specification and drawings.

DETAILED DESCRIPTION OF THE INVENTION

Figure 1A:
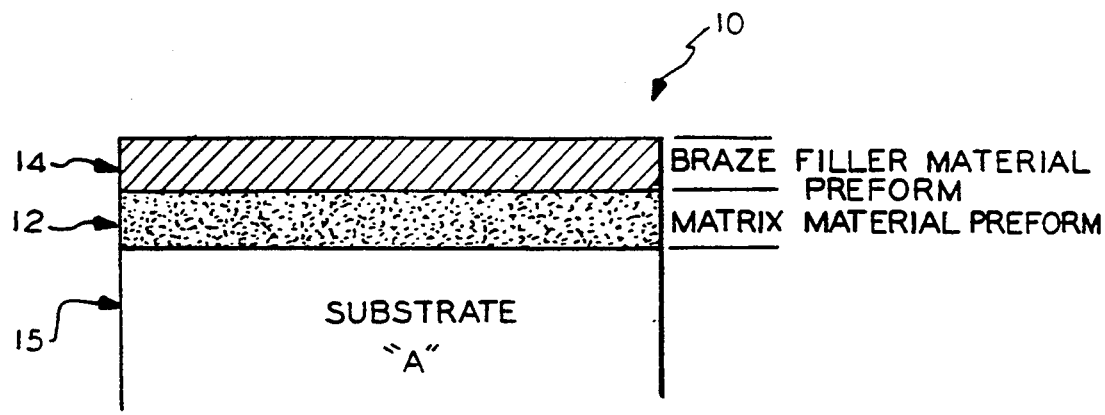
FIGS. 1A and 1B illustrate (A) the composite formed according to the prior art versus (B) the composite formed according to the present invention.
Figure 2:
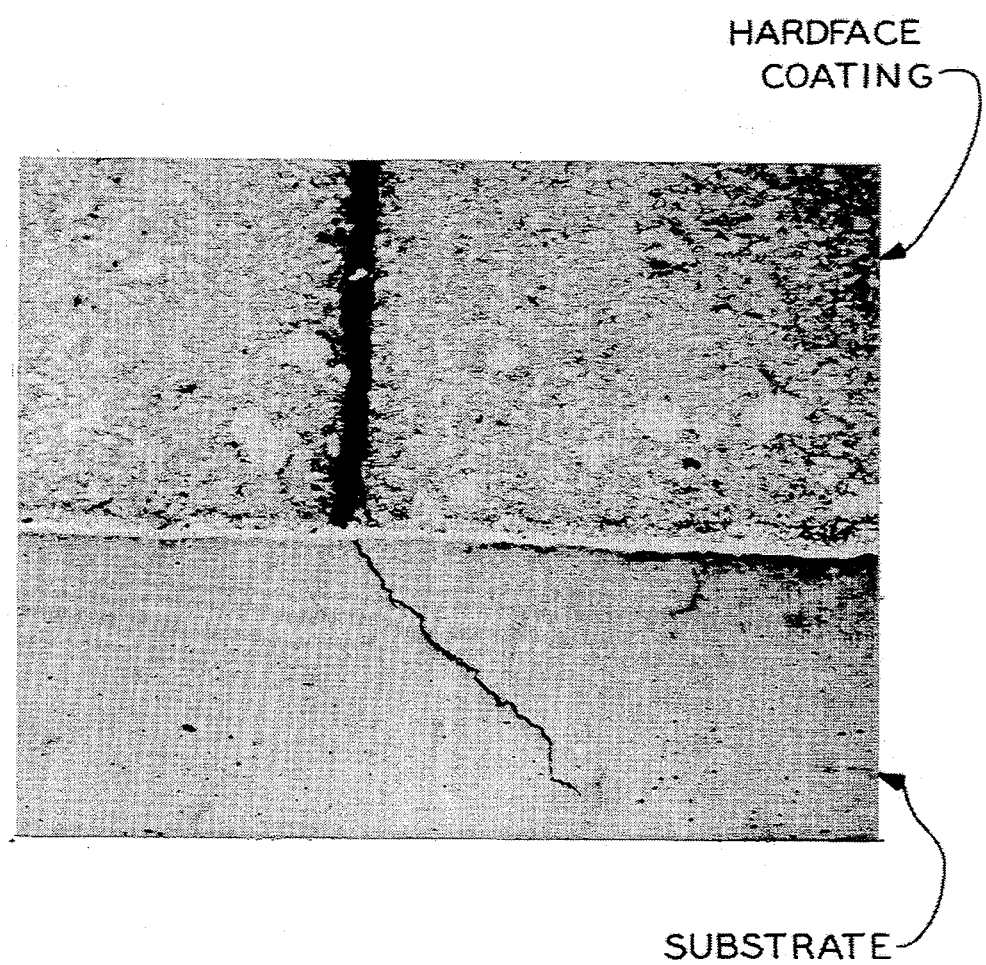
FIG. 2 is a photomicrograph of a cross section of a heat treated composite of FIG. 1A.

Referring now to the drawings wherein the showings are for purposes of illustrating the prior art and preferred embodiments of the invention only and not for the purpose of limiting same. FIG. 1A shows a composite article 10 of the prior art in which a hard matrix surface layer or preform 12 and a braze metal layer preform 14 are heated as fully described in U.S. Pat. No. 3,743,556 to provide surface coating (See FIG. 2) on a substrate 15. Briefly, the coating is achieved on the substrate by first laying a flexible hard particle layer preform (matrix powder material in fibrillated PTFE) on the substrate surface to be coated and then a braze filler alloy layer or preform ( typically also braze filler material in fibrillated PTFE although it can be a sheet of braze material for certain applications) is applied on top of the hard particle preform. The weight and thickness of this braze layer or preform is matched to the relative density of the hard particle preform to yield a fully dense layer or coating of the same general thickness as that of the original hard particle metal layer. An adhesive can be used, if desired, to initially hold this assembly together. Brazing is done in a controlled atmosphere or in a vacuum at a temperature above the liquids temperature of the braze filler but below that of hard particle material. At such temperature, molten braze infiltrates through the matrix hard particle preform and fills the voids and subsequently bonds to the substrate by diffusion effect yielding a coating layer essentially the same thickness as initial matrix metal layer.

Figure 1B:
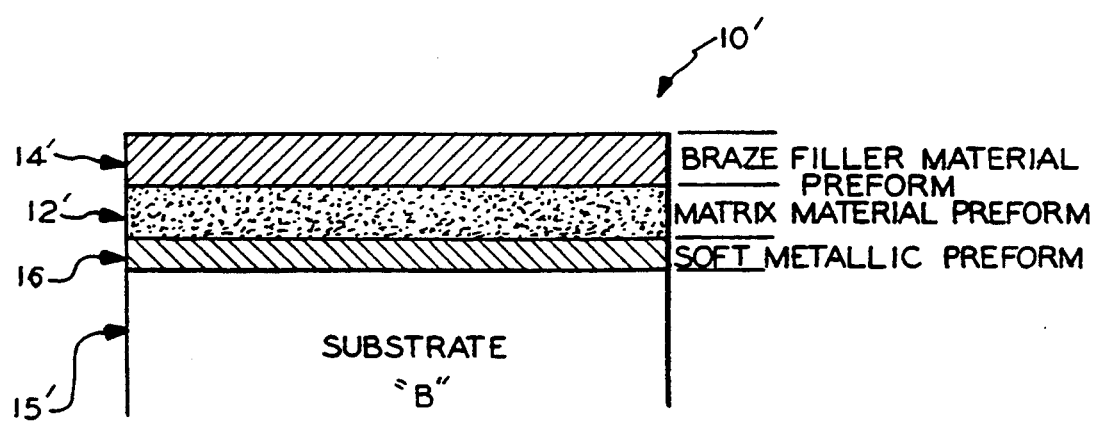

FIG. 1B shows a composite article 10' of the present invention with a hard matrix surface layer or preform 12' and a braze metal layer or preform 14'. The hard matrix surface layer or preform 12 is typically made of hard particle material such as tungsten carbide, titanium carbide, nickel boride, chromium carbide or the like entrapped in an organic binder of fibrillated PTFE. The braze metal layer or preform 14' is also typically made with appropriate high temperature braze powders entrapped in an organic binder of fibrillated PTFE although in certain applications sheets of solid braze material may be used.

In accordance with this invention, a soft metal ( typically an alloy) sheet or preform 16 is used. The metal or alloy has a hardness below 35 HRC (preferably below 30 HRC ) and should not experience any significant physical changes, e.g. , hardness upon heat treatment. Some standard soft metallic materials used are 304 stainless steel, 316 stainless steel, iron, inconel 600 and other like alloys. Typically soft sheet or preform 16 is at least 0.0300 an inch with the upper limit on the thickness being that thickness which would materially effect strength properties of the finished composite article. This preform 16 is positioned on the surface of substrate 15' with hard matrix surface layer 12' on top of preform 16 with braze preform on top of all of the preforms (see FIG. 1B). These preforms are cut to the desired configuration and may be held in place prior to heat brazing operation with an adhesive material. Both the hard matrix powder material and the soft powder material is characterized as being wetted by the brazing filler metal or alloy in the molten state. When the assembly is heated the binder decomposes and the braze filler material top layer is infused by capillary action into both the matrix layer and soft metal sheet. This heating temperature is above the liquids temperature of braze filler material but below the liquids temperature of hard particle material and soft metal material. Cooling of the assembly yields an essentially void free diffusion bonded composite article with substrate, soft metal layer and hard surface coating ( See FIG. 3 ). This composite article is made with a single heat brazing operation with the different preforms being able to conform to complex geometries or a surface out of the line of sight The present, invention is described in greater detail with reference to the following examples contrasting the prior art and preferred practices of the invention.

EXAMPLE I

Tungsten carbide powder (40% by volume 2 to 5 micron size particles and 60% by volume −325 mesh size particles) was mixed with 6% by volume of Teflon (PTFE). This mixture was mechanically worked to fibrillate the PTFE and trap the tungsten carbide particles, thus making a cloth-like sheet as more fully described in U.S. Pat. No. 4,194,040. The sheet was rolled to a 0.045" thickness.

A braze alloy powder with the composition of 81.5% nickel, 15% chromium, 3.5% boron by volume was mixed with 6% volume of PTFE to form a cloth-like sheet, similar to that of tungsten carbide sheet set forth above. The test sample to be hardfaced was AISI 4140 steel. A carbide preform was applied on the substrate surface by means of an adhesive, and on top of it a braze alloy preform was glued as shown in FIG. 1A. The test sample was heated in a hydrogen atmosphere to 2085° F. for approximately 15 minutes, during which the braze preform melted and infiltrated the carbide preform. Upon cooling, a fully dense tungsten carbide coating on a steel substrate was formed as described more fully in U. S. Pat. No. 3,743,556.

The tungsten carbide coated 4140 steel sample was heat treated by heating it to 1600° F. for 2 hours and quenching in oil. Later it was tempered at 1200° F. for 3 hours. Visual examination showed a network of cracks on the coating surface. A metallography examination indicated that cracks had initiated at the carbide surface and had penetrated into the substrate as shown in the FIG. 2.

EXAMPLE II

The same type of tungsten carbide and the braze alloy preforms were used for this test as those employed in Example I. In addition, however a preform of 316 stainless was formed. Power of 316 stainless steel (−140 mesh particle size) was mixed with 6% volume PTFE and was mechanically fibrillated and rolled into cloth-like sheet, again as described in U.S. Pat. No. 4,194,040. This sheet was rolled to 0.030" thickness. The substrate for this test sample was also AISI 4140 steel.

The difference between this test and the one of Example I was the addition of the 316 preform, sandwiched between the substrate surface and the carbide preform as shown in FIG. 1B. This test sample was brazed under the same conditions as the Example I test. At the brazing temperature, when the braze preform melted, it first infiltrated through the carbide and then into the 316 preform. Upon cooling, a two layered coating was formed, the first layer was soft and the top layer was hard carbide coating.

Figure 3:
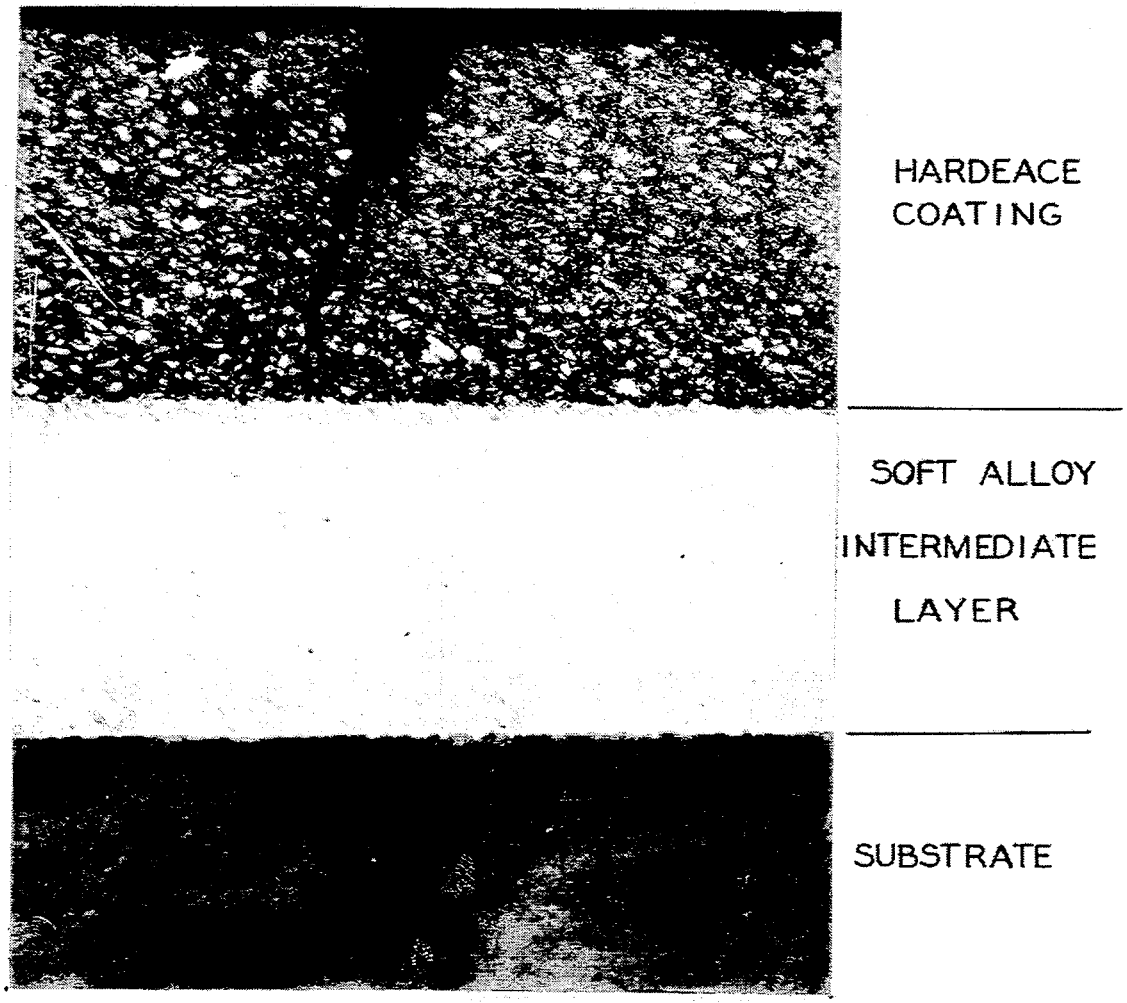
FIG. 3 is a photomicrograph of a cross section of a heat treated composite according to the present invention.

This coated test sample was heat treated the same way as the Example I test sample. Visual examination indicated a network of cracks on the carbide coating surface. The metallography examination revealed that while these cracks had also propagated through carbide coating, none had penetrated into the 4140 steel substrate. As shown in FIG. 3, these cracks were either arrested at the carbide/intermediate soft layer interface or within the soft layer. The hardness of the intermediate soft layer was measured to 35 HRC.

While the composite specifically described herein has a single hardface layer, it will, of course, be understood that a plurality of thin hardfacing preforms can be employed as taught in U.S. Pat. No. 5,164,247.

While the composite articles in the drawings have been illustrated as having a bar shape, they may also as noted be round shaped or they may have square, oval, elongated or any other suitable shape especially those having a non-linear configuration.

The patents, patent application and foreign patent publications set forth in the specification are intended to be incorporated by reference herein.

It is apparent that there has been provided in accordance with this invention a process and product which fully satisfy the objects, means and advantages set forth hereinbefore. While the invention has been described in combination with the specific embodiments thereof, it is evidence that many alternatives, modifications, and variations will be apparent to those skilled in the art in light of the foregoing description. Accordingly, it is intended to embrace all such alternatives, modifications and variations as fall within the spirit and scope of the appended claims.

We claim:

1. An improved metallurgically coated hardfaced composite article, the article is produced by a single heat brazing of a braze metal layer with a hard matrix preform layer containing a hard particle material in e PTFE carrier material to a surface of a metal substrate to form a hard metallic coating on said substrate, wherein the improvement comprises:

a soft metal preform layer between said substrate and the hard matrix preform layer, wherein said soft metal preform layer is comprised of a soft metallic particle material in a PTFE carrier to prevent crack propagation from the hard metallic coating into the substrate.

2. The hardfaced composite article of claim 1, wherein the soft metallic particle material is selected from the group consisting of 304 stainless steel, 316 stainless, iron and iconel 600.

3. The hardfaced composite article of claim 1, wherein the soft metallic particle material has a hardness which does not exceed 35 HRC.

4. An improved method of producing, a metallurgically coated hardfaced composite article, having a hard metallic surface layer on a substrate, the surface layer constituting a heat brazed product of a hard matrix preform layer, the preform layer being made by mixing a hard particle material with a mechanically fibrillated PTFE carrier material and rolling the mixture to form the preform in a desired configuration, the method which includes placing the preform layer on the substrate and heat brazing the preform to the substrate with a braze metal layer yielding a metallurgically coated hardfaced composite article; wherein the improvement comprises:

placing a soft metal preform layer between the substrate and the hard matrix preform layer, wherein said soft metal preform layer is comprised of a soft metallic particle material mixed with a mechanically fibrillated PTFE carrier and rolling the mixture to form the soft metal preform in a desired configuration to prevent crack propagation from the hard metallic surface coating into the substrate.

5. The method as in claim 4, wherein the soft metallic particle material is selected from the group consisting of 304 stainless steel, 316 stainless steel, iron and iconel 600.

6. The method as in claim 4, wherein the soft metallic particle material has a hardness which does not exceed 35 HRC.

* * * * *